United States Patent [19]
Eckardt

[11] 3,903,467
[45] Sept. 2, 1975

[54] ARRANGEMENT FOR RAPID EXCITATION OF STEP MOTOR WINDINGS

[75] Inventor: Lutz Eckardt, Jena-Neulobeda, Germany

[73] Assignee: Jenoptik Jena G.m.b.H., Jena, Germany

[22] Filed: June 27, 1974

[21] Appl. No.: 480,346

[30] Foreign Application Priority Data
Aug. 9, 1973 Germany.............................. 17213

[52] U.S. Cl. .............................................. 318/696
[51] Int. Cl............................................. Ho2k 37/00
[58] Field of Search..................... 318/138, 685, 696

[56] References Cited
UNITED STATES PATENTS

| | | | |
|---|---|---|---|
| 3,452,263 | 6/1969 | Newell................................ | 318/696 |
| 3,560,821 | 2/1971 | Beling................................. | 318/138 |
| 3,757,193 | 9/1973 | Inaba et al.......................... | 318/696 |

*Primary Examiner*—G. Z. Rubinson

[57] ABSTRACT

In a device for rapid control of a step motor excitation winding, said winding is connected by a transistor via an RC-element to a voltage source. Simultaneously the winding is connected via a decoupling diode with a second voltage source. The cathode of a thyristor, which is connected in parallel to the resistance of the RC-element is also coupled to the windings and is controlled in dependence of the induction voltage of the winding and the voltage of the capacity of the RC-element.

1 Claim, 1 Drawing Figure

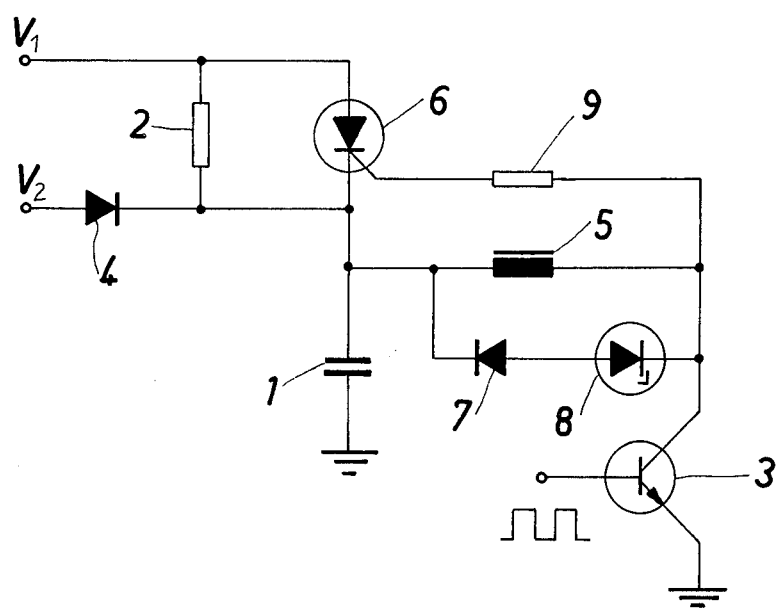

ARRANGEMENT FOR RAPID EXCITATION OF STEP MOTOR WINDINGS

The invention relates to an arrangement for rapid excitation of the windings of fast step motors.

There are already circuit arrangements known, in which the voltage source is applied to the windings of a step motor via a transistor, in which the windings are series connected to an additional transistor and to a switching arrangement, which in order to obtain a comparatively steep current rise, supplies a short lived comparatively high voltage across the windings so that, when the current has reached its nominal rating, a comparatively low voltage lies there across.

The switching circuit comprises a current dependent feed back circuit, a timing circuit or a threshold element. The disadvantage of such a circuit lies in the fact that due to the use of a plurality of transistors the expenditures are comparatively high.

It is an object of the present invention to provide a circuit for rapid excitation of step motor windings by use of comparatively simple means.

Accordingly the invention is concerned with an arrangement for rapidly switching step motor windings in which the windings are connected to a voltage source by means of a transistor via an RC-unit and in which a further voltage source, decoupled by a diode, is connected to the windings, characterized in that a thyristor lies in parallel with the resistance of the RC-unit, the thyristor cathode is further connected to the windings, and that an additional circuit lies at the gate to control said thyristor in dependence of the inductive voltage of the windings and of the capacitor voltage.

In order that the invention may be more readily understood reference is made to the accompanying drawing which illustrates diagrammatically and by way of example one embodiment thereof and in which the FIGURE shows a schematic view of the inventional circuit.

When two voltage sources $U_1$ and $U_2$ are switched in, a capacitor 1 is at first rapidly loaded to the voltage $U_2$ and thereafter to the voltage $U_1$ in accordance with an e-function having a respective time constant $\tau$ which is determined by a capacitor 1 and a resistor 2.

The resistor 2 is such dimensioned that the voltage of the capacitor 1 has substantially reached its maximum value when a transistor 3 is turned on for the first time and a low power is dissipated in the resistor 2. The transistor 3 is triggered by a square wave pulse at its base. A diode 4 prevents a discharge of the capacitor 1 across the voltage source $U_2$. When the transistor 3 is operated the capacitor 1 discharages via a step motor winding 5.

The high capacitor voltage effects a rapid current rise. When the capacitor 1 has discharged to $U_2$, then $U_2$, which is so high as to ensure a static current flow through the step motor windings 5, supplies the coil current. From this time on and under the condition that the resistor 2 is considerably higher ohmic than the resistance of the windings 5, the static current can be held in the circuit at a lowest possible power dissipation.

When the transistor 3 is turned off the current flow through the windings 5 is cut off. The voltage which results therefrom across the windings 5 triggers a thyristor 6, through which the capacitor 1 is rapidly loaded to the voltage $U_1$. When the charging operation is completed the thyristor extinguishes.

The system, including a diode 7, a Zener diode 8 and a resistor 9 makes up an extinguishing unit which is so set by resistor 9 that a fast decay of the coil current is obtained, and that the thyristor 6 is reliably triggered, a considerably larger amount of the turn-off energy is dissipated across the resistor 9 and the thyristor 6 and that the collector voltage of transistor 3 does not exceed the maximum reverse voltage.

The transistor 3 can be in the off-state for considerable time, because the leakage current is compensated by the resistor 2 and the capacitor 1 holds the entire capacity. The operation is repeated when the transistor is turned on again. Due to the rapid charging operation via thyristor 6, the capacitor 1 is charged even at high switching frequencies to the charge voltage $U_1$. When the switching frequency is further increased the thyristor 6 does not extinguish any more and a continuous windings current flows across the voltage source $U_1$. Consequently, the switching frequency, at which the rated value current through the windings 5 can still be obtained, is only dependent from the voltage rating $U_1$. The current over-shoot in the windings 5 can be controlled by the capacitor 1 over a wide range. Preferably, the turn-off power is exploited for triggering the thyristor 6 so that the extinguishing unit 7, 8 may be dispensed with.

The effectivity of the circuit can be improved by a windings in series to the thyristor 6 and to the capacitor 1 so that the capacitor 1 can be charged with a capacity higher than $U_1$.

The principle underlying the invention is not restricted to the embodiment described hereinbefore, it is also applicable for different RC-combinations, in which, for example, the capacity and the resistor are in parallel, and in series with respect to the windings.

I claim:

1. A device for controlling the excitation winding of a step motor by different voltages, comprising
   a first voltage source,
   a second voltage source,
   a thyristor,
   a first diode
      said first voltage source being connected to the anode of said thyristor,
      said second voltage source being connected to the anode of said first diode,
      the cathode of said first diode being connected to the cathode of said thyristor,
   a first resistor, being connected in parallel to the cathode-anode path of said thyristor,
   a capacitor, grounding the cathode of said thyristor,
   a second diode,
   a Zener diode,
   a transistor,
      one terminal of the step motor winding being connected to the cathode of said thyristor and to the cathode of said second diode, the other terminal being connected to the cathode of said Zener diode and to the collector of said transistor,
      the emitter of said transistor being grounded,
   a second resistor, connecting the gate electrode of said thyristor
      with the cathode of said Zener diode, the anode of said second diode being connected to the anode of said Zener diode,
   a square-wave voltage, being applied to the base of said transistor.

* * * * *